United States Patent [19]

Mole

[11] Patent Number: 5,663,497

[45] Date of Patent: Sep. 2, 1997

[54] SIX COMPONENT WIND TUNNEL BALANCE

[76] Inventor: Philip J. Mole, 4138 Catalina Pl., San Diego, Calif. 92107

[21] Appl. No.: 684,816

[22] Filed: Jul. 22, 1996

[51] Int. Cl.[6] .............................. G01M 9/02; G01M 9/06
[52] U.S. Cl. .............................. 73/147; 73/865.6
[58] Field of Search .................. 73/147, 865.6

[56] References Cited

U.S. PATENT DOCUMENTS

| 3,019,643 | 2/1962 | Curry | 73/147 |
| 5,113,696 | 5/1992 | Mole | 73/147 |

*Primary Examiner*—Richard Chilcot
*Assistant Examiner*—Joseph L. Felber

*Attorney, Agent, or Firm*—John R. Duncan; Frank D. Gilliam; Donn K. Harms

[57] ABSTRACT

A six component balance for use in measuring forces and moments on an aircraft model in a wind tunnel or the like. The balance is mounted on a wind tunnel sting by means of a sleeve that surrounds and is spaced from a central core. The central core is connected to a model by support bars passing through slots in the sleeve from the core. Core ends are secured to the sleeve and support the central core through a plurality of webs. A plurality of strain gages are mounted on the webs to detect strain on the webs resulting from forces and moments applied to the model. This system measures six components, i.e., lift force, drag force, side force, pitching moment, yawing moment and rolling moment.

11 Claims, 3 Drawing Sheets

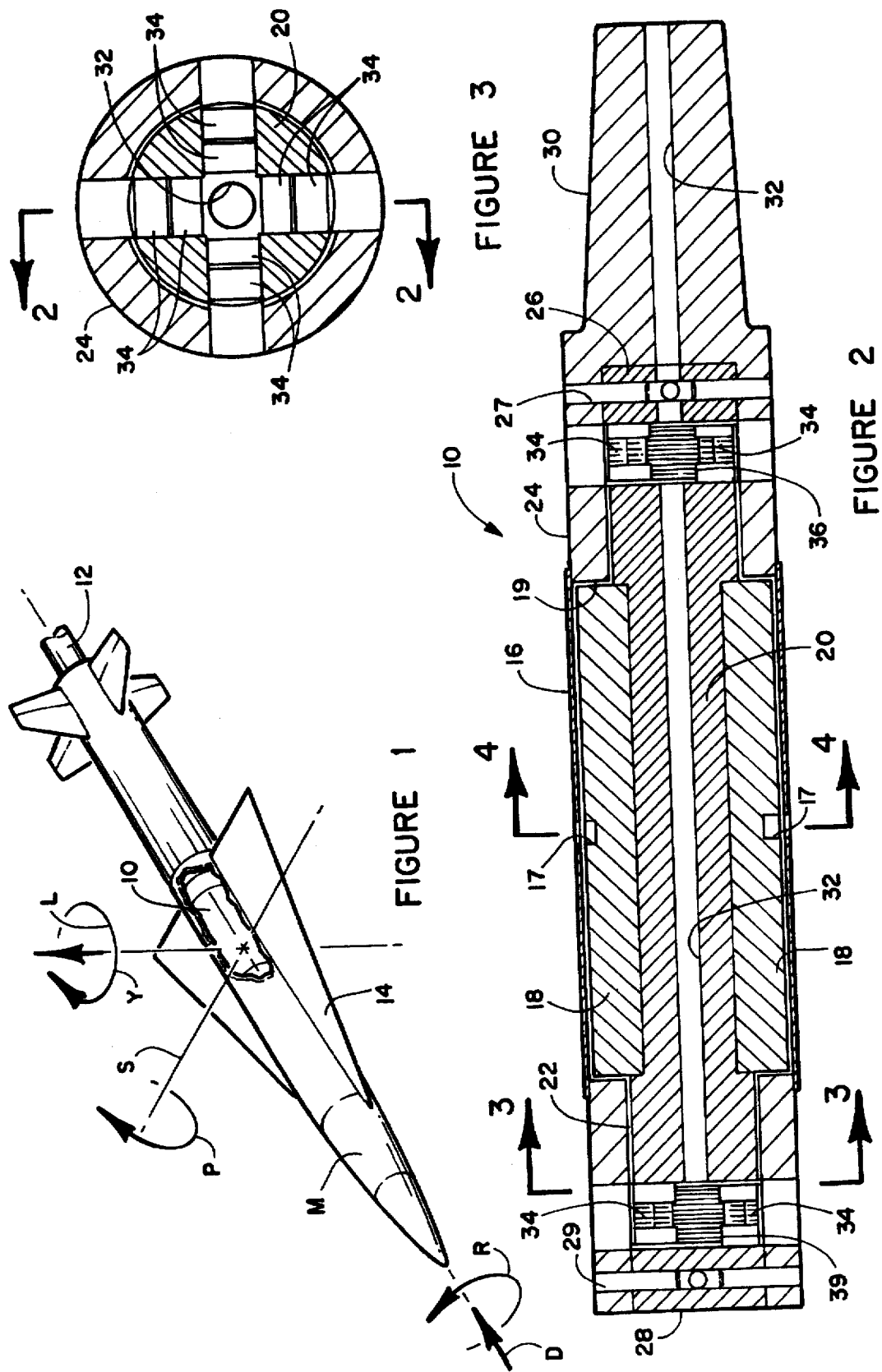

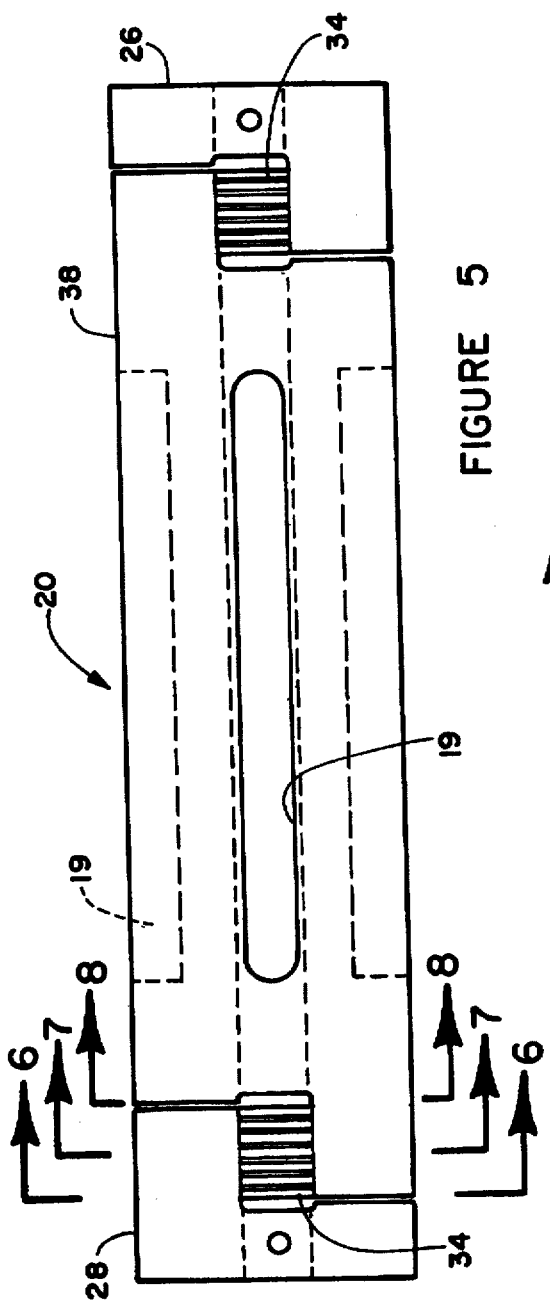
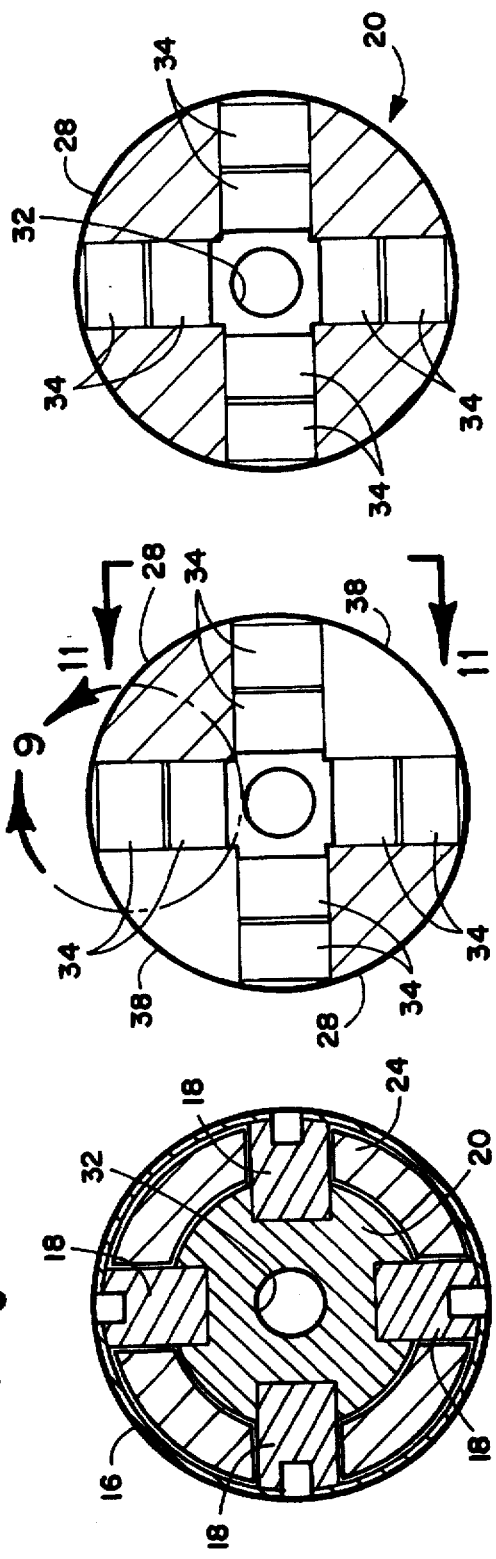

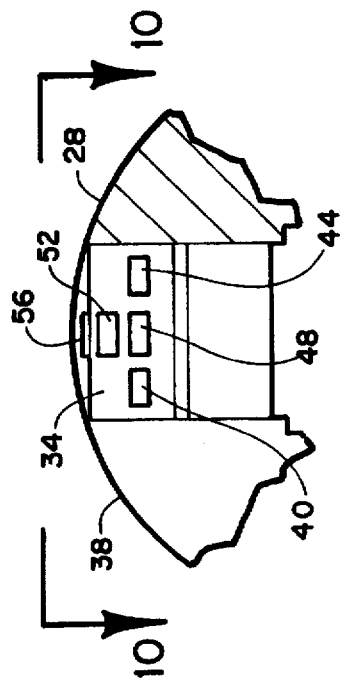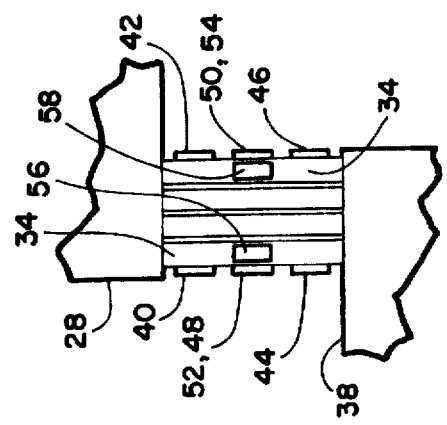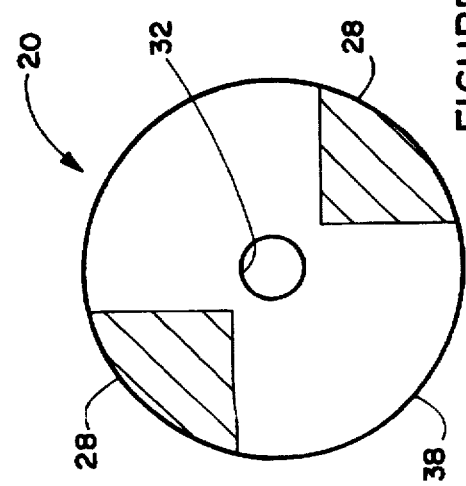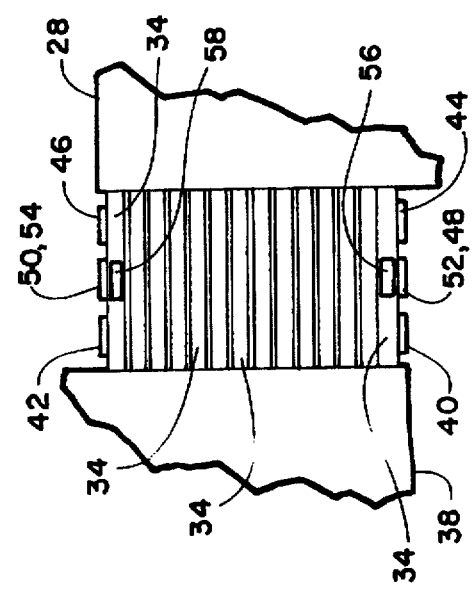

SIX COMPONENT WIND TUNNEL BALANCE

BACKGROUND OF THE INVENTION

This invention relates in general to force measuring instruments used during non-destructive testing, and more particularly to the measuring of force and moments on wind tunnel models of aircraft or other airborne vehicles.

There are six components of force and moment acting on a wind tunnel model which are of interest to the designer in evaluating the flying qualities of an aircraft. These six components are known by those skilled in the art as lift force, drag force, side force, pitching moment, yawing moment, and rolling moment. By determining the magnitude of these components acting on a scale model in a wind tunnel, certain design parameters can be obtained which will apply to the full scale aircraft.

Prior art strain gage balances have been successfully utilized to measure the forces on wind tunnel models. The moments and forces acting on the model are usually resolved into three components of force and three components of moment by providing different members within the balance that are sensitive only to one or two components. Each of the members carries strain gages which are connected in combinations that form Wheatstone bridge circuits. By appropriately connecting the strain gages, the resulting Wheatstone bridge circuit unbalances can be resolved into readings of the three components of force and three components of moment.

Wind tunnel and non-destructive testing of scale or full size models require the use of six component load measuring devices to measure all the applied loads on a wind tunnel model or test article within 0.3% of maximum load accuracy. These devices are called six-component balances. Prior six-component balances with a two shell structure such as is disclosed in my prior U.S. Pat. Nos. 3,878,713 and 5,201,218 have a core or inner shell, termed the "non-metric" side of the balance, mounted on the sting with the outer shell, the "metric" balance side, mounted on the model. The major weakness of these two shell balances lies in the non-metric inner shell or rod which is necessarily small in diameter and is the major structural load carrying part of the balance. The resulting high stress in the balance webs seriously limit the balance capacity.

In recent years it has become increasingly evident that the accuracy and usefulness of wind tunnel data is directly related to matching full scale Reynolds Numbers in the test facilities. This condition creates significant difficulties for existing six component balances. The extremely high loads generated by the high dynamic pressure require improvements in balance capacity.

All access to the model is by way of the sting support, having the balance attached at the upstream end. The balance must be small enough to fit through the aft end of the model into a cavity within the model. All tubes, hoses, wires and such must compete within the balance for the small cross section of area available within the slim cavity of the models. Achieving higher load carrying capacity by simply enlarging the balance is not acceptable because of the limited maximum diameter available.

Thus, there is a continuing need for improved six-component wind tunnel balances having improved load capacity, the ability to operate at higher Reynolds numbers, decreased cross sectional area to fit within slim models and accurate readings of all six components.

SUMMARY OF THE INVENTION

The above-noted problems, and others, are overcome in accordance with this invention by an improved wind tunnel balance for measuring six components of force and moments. The balance is a symmetrical structure employing rigid load cells in which many undesired interactions are canceled out. Basically, the balance comprises an outer sleeve within which is disposed a cylindrical core, the outside diameter of the core being less than the inside diameter of the sleeve so that a small annular clearance exists between them. The outer sleeve includes means for mounting on a wind tunnel sting to hold the sleeve in a stationary position. The core includes attachment means to secure the core within a model to be tested. The inner core is thus subject to all of the lift, drag and side forces as well as pitch, yaw and roll moments imposed on the model. The outer sleeve is interconnected to the inner core by a plurality of load cells for measuring these various forces applied to the model and inner core.

A plurality of webs are provided near each of the two ends of the inner core to transmit loads and moments from the core to the outer sleeve. A plurality of strain gages attached to each of these webs record loads thereon. At least one central conduit is provided through the inner core to the sting through which air or other fluids can be provided to the model as needed for particular tests and through which wires from the strain gages to electronic analytical equipment can be run.

Many of the advantages of the wind tunnel balance of this invention are achieved by utilizing stiffness in place of flexibility in the load cells of the balance. Prior balances often used flexibility to isolate interactions between the various load cells. With the present stiff balance, movement of the load cells is decreased which I have found reduces interactions. Additionally, the dynamic characteristics of the model are improved, since a stiffer balance prevents dynamic vibration over a greater range than would a flexible balance. Also, because of the reduced excursions or deflections of the model during testing, the clearances between the test model and the sting can be reduced to provide an aerodynamically cleaner arrangement.

It is, therefore, an object of this invention to provide a wind tunnel balance having higher strength and, due to the higher strength, a smaller diameter. Another object is to provide a balance having improved stiffness. A further object is to provide a balance in which web stress is reduced. Still a further object is to provide a balance capable of measuring loads and moments with greatly reduced deflection per unit load.

BRIEF DESCRIPTION OF THE DRAWING

Details of the invention, and of preferred embodiments thereof, will be further understood upon reference to the drawing, wherein:

FIG. 1 is a schematic perspective view of a model supported by a balance on a sting;

FIG. 2 is an axial section view through the balance of this invention, taken on line 2—2 in FIG. 3;

FIG. 3 is a transverse section view through the balance, taken on line 3—3 in FIG. 2;

FIG. 4 is a transverse section view through the balance, taken on line 4—4 in FIG. 2;

FIG. 5 is a side elevation view of the balance inner core;

FIG. 6 is a section view taken on line 6—6 in FIG. 5;

FIG. 7 is a section view taken on line 7—7 in FIG. 5;

FIG. 8 is a section view taken on line 8—8 in FIG. 5;

FIG. 9 is a detail view of area 9 in FIG. 6;

FIG. 10 is a detail view taken from line 10—10 in FIG. 9; and

FIG. 11 is a side view taken on line 11—11 in FIG. 6.

DETAILED DESCRIPTION OF PREFERRED EMBODIMENTS

Referring to FIGS. 1-3, there is schematically illustrated a typical installation wherein a model M is positioned in a wind tunnel by means of a balance 10 with a sting 12 aligned in a generally horizontal position and projecting upstream in the wind tunnel. The model 14 engages a portion of the balance 10 in such a manner that the three components of moment and the three components of force will be detected by the balance 10. These components are shown in FIG. 1 wherein the roll moment is indicated by the circular arrow R, the pitching moment by the circular arrow P, the yaw moment by the circular arrow Y, the drag force by the arrow D, the side force by the arrow S, and the lift force by the arrow L.

The balance is disposed near the center of gravity of the model and all forces detected by the balance are communicated by means of electrical wires which are routed through the sting 12 and through a stationary base to the information receiving computer or the like (not shown). In a like manner tubes for communicating fluids, such as air, to the model are routed through the hollow sting.

The overall structure of balance 10 is detailed in FIGS. 2-4. Model 14 is fastened to support ring 16 which in turn transfers through four support bars 18 the three components of moment and the three components of force on model 14 that will be detected by balance 10. Pin holes 17 are provided for attachment of a model to be tested. Any other connection means may be used, as desired. Support bars 18 pass through slots 19 with the surfaces of the support bars spaced from the inner walls of slots 19. Inner core 20 is shaped and mounted so as to provide a small annular clearance 22, typically about 0.040 to 0.060 inch but exaggerated in this schematic drawing for clarity, between core 20 and outer sleeve 24. End regions 26 and 28 of core 20 are a snug fit within sleeve 24 and are held in place in any suitable manner, such as pins, brazing or both.

Tapered end 30 fits into a corresponding recess (not shown) in sting 12 to hold the balance in place. Any other suitable mounting means may be used. A central orifice 32 provides room for running wires (not shown) from the various strain gages to the data collection site and for electrical wires from model instrumentation, etc. as required by a model. Strain gage supporting webs 34 and 36, as detailed below, are the only connections between the central portion of core 20 and end portions 26 and 28 of the core. Webs 34 and 36 are basically identical series of spaced metal webs. Holes 27 and 29 are provided for insertion of a fixture support pins to position components during brazing.

Details of inner core 20 and the strain gage system are provided in FIGS. 5-8. Inner core 20 is preferably machined from one piece of stock. The only connection between end portion 28 and central portion 38 of core 20 is through webs 34. Similarly the only connection between end portion 26 and central portion 38 is through web 36. Since end portions 26 and 28 are firmly attached to sleeve 24 (FIG. 2) and thence sting 12 (FIG. 1), forming the non-metric side of the balance, and portion 38 is firmly attached to the model 14, or metric side of the balance, all loads imposed on model 14 must be transferred to sting 12 by means of metric forward webs 34 and metric aft webs 36. Thus, by strain gaging of webs 34 and 36 to form load cells, it is possible to record the forces acting on model 14.

For best results, inner core 20 should be formed from any suitable material that will exhibit a high degree of uniformity and absence of internal stresses to provide uniform and predictable strength, strain and fatigue endurance characteristics and produce strains proportional to load with minimum error. Typical optimum materials include 17-4 stainless steel and 18 Ni maraging steel. Because of this need for uniformity and elimination of material stresses, the core 20 should be machined from a single billet rather than made up from components, such as by machining parts and welding them together.

Details of the strain gage arrangements are detailed in FIGS. 9 and 10. FIG. 9 is an enlarged detail view of a portion of the section of FIG. 6, showing one of the webs 34 and strain gages 40, 44, 48, 52 and 56. FIG. 10 is a top view of the web shown in FIG. 9, showing strain gages 40, 44, 48, 52, and 56 on one side of web 34 and 42, 46, 50, 54 and 58 on the other side. Each of the other three webs 34 and four webs 36 have the same strain gage arrangement. The strain gages are preferably conventional precision foil gages, with thicknesses exaggerated in the drawing for clarity. Gages 52 and 54 may be located on web sides, as shown, or on the web end, adjacent to gages 56 and 58, as desired. In general, the top surface location is preferred where web 34 has sufficient thickness to accommodate two strain gages. The thickness, width and length of webs 26 and 28 are functions of the loads to be measured and the degree of stiffness desired.

FIG. 11 is a is a side view of a central portion of the web arrangement shown in FIG. 6. Here, webs 34 extending between end 28 and central portion 38 measure side forces via strain gages 40, 42, 44, 46, 50, 54, 56 and 58 in the same manner as normal forces are measured in the webs detailed above in the description of FIG. 10.

Gages 40-58 are electrically interconnected in Wheatstone bridge circuits in various combinations to measure the sums and differences of loads and moments in order to obtain the desired six force and moment readings. Gages 48 and 50 of the forward upper web 34 are interconnected with gages 48 and 50 of the diametrically opposite lower web 34 to form a bridge identified as Y1. Gages 48 and 50 of the left side web 34 are interconnected with gages 48 and 50 of the diametrically opposite right side web 34 to form a bridge identified as N1. In a like manner, the gages 48 and 50 on the aft webs 36 are interconnected to form bridges Y2 and N2. Before any additional connections of gages are made, a series of calibration loadings should be recorded for each of the unconnected gages 40, 42, 44, 46, 56 (or 52) and 58 (or 54) to determine which gages indicate the least interaction and greatest accuracy.

From gages 40-46 on the forward webs 34 (total of 16 gages) four are selected and interconnected to form bridge AXIAL1. In a like manner, four gages selected from any of the sixteen gages 40 and 46, on aft webs 36 are interconnected to form bridge AXIAL2.

From the eight gages 56 and 58 of the forward webs 34, four are selected to form bridge ROLL1 and from the eight corresponding gages on the four aft webs 36, four are interconnected to form bridge ROLL2. Eight bridges have been identified, four from webs 34, Y1, N1, ROLL1 and AXIAL1 and four from webs 36, Y2, N2, ROLL2 and AXIAL2.

Bridges ROLL1 and ROLL2 are wired in parallel, resulting in a single output identified as ROLLtotal. Bridges AXIAL1 and AXIAL2 are also wired in parallel to give a single output AXIALtotal. Thus, there are six outputs from the combinations of gages which are Y1, Y2, N1, N2, ROLLtotal and AXIALtotal, and by use of well known calibration techniques and conventional equations, the outputs may be used to determine lift force, drag force, side force, pitching moment, yawing moment and rolling moment.

Bridges ROLL1, ROLL2, and AXIAL1, AXIAL2 are preferably wired in parallel to compensate for dimensional changes in the balance caused by thermal effects. Referring to FIG. 2, it can be seen that any dimensional change of sleeve 24 relative to inner core 20 causes webs 34 and 36 to deflect in opposite directions. However, axial loads on model 14 which are transferred to balance 10 by means of model attachment fitting 30 and support ring 16, will cause webs 34 and 36 to deflect in the same direction. Thus by wiring the AXIAL bridges and ROLL bridges in parallel they mathematically average the outputs from each independent bridge, resulting in an arrangement where opposite deflections, such as are caused by temperature changes, are nulled-out leaving the AXIAL and ROLL loads as the only output of the circuits.

In the described system, for each of the AXIAL bridges there are 16 gages available (four each of 40, 42, 44 and 46) the four most accurate gages are selected for each of the AXIAL bridges. In a like manner, the next four most accurate gages can be selected to form another AXIAL bridge, which could serve as a spare should the primary bridge fail at any time during a test. In this same manner, standby or spare ROLL bridges may be provided.

While only 32 gages (for eight bridges) are required to obtain the desired measurements, often it is desirable to install 64 gages of the sort described herein to obtain greatly improved accuracy. Calibration runs sometimes determine that the four most accurate gages for a bridge may all be on one web. At other times, only one gage from each of the four webs is selected. Any other combination in between these two extremes may prove most accurate on another balance.

While certain specific relationships, materials and other parameters have been detailed in the above description of preferred embodiments, those can be varied, where suitable, with similar results. For example, while the balance has been described as cylindrical in the above description of preferred embodiments, any suitable cross sectional shape or dimensions may be used. Typically, the cross section may be square, hexagonal, etc. and where more stiffness is required in one plane than another the cross section may be elliptical, rectangular or any other shape having a major axis.

Other applications, variations and ramifications of the present invention will occur to those skilled in the art upon reading the present disclosure. Those are intended to be included within the scope of this invention as defined in the appended claims.

I claim:

1. An improved strain gage balance of the type adapted to be secured in a cavity with the body of a model disposed in a test tunnel flow field for measuring component forces and moments applied thereto, said balance adapted for mounting on a sting in said tunnel, said balance comprising:

a sleeve having means at a first end for mounting on a test tunnel sting;

a core member within said sleeve, spaced from said sleeve and including means extending through openings in said sleeve for fastening to a test model;

core end members at each end of said core member secured to said sleeve;

a plurality of webs between said core member and said core end members; and a plurality of strain gages on said webs for indicating strain on said webs resulting from forces and moments on said model.

2. The balance according to claim 1 wherein said means for fastening said core member to said model comprises:

at least four longitudinal slots through said sleeve, arranged radially around said sleeve;

a support ring around said sleeve and spaced therefrom;

a support bar extending through each slot out of contact with said sleeve and secured to said core member and said support ring; and said support ring adapted to be secured to a model interior.

3. The balance according to claim 2 wherein four substantially evenly spaced slots and four support bars are provided.

4. The balance according to claim 1 wherein said core member is formed from a single piece of material that has been machined to the predetermined configuration.

5. The balance according to claim 1 wherein said sleeve is formed from a single piece of material that has been machined to the predetermined configuration.

6. The balance according to claim 1 further including an axial orifice for passage of wires to said strain gages and pressurized fluid to said model.

7. An improved strain gage balance of the type adapted to be secured in a cavity with the body of a model disposed in a test tunnel flow field for measuring component forces and moments applied thereto, said balance adapted for mounting on a sting in said tunnel, said balance comprising:

a sleeve having means at a first end for mounting on a test tunnel sting;

a core member within said sleeve, spaced from said sleeve; at least two longitudinal slots extending through said sleeve and into said core member, said slots arranged radially around said sleeve and core member;

a support ring around said sleeve and spaced therefrom adapted to be secured to a model;

a support bar extending through each slot out of contact with said sleeve and secured to said core member and said support ring;

core end members at each end of said core member secured to said sleeve;

a plurality of webs between said core member and said core end members; and a plurality of strain gages on said webs for indicating strain on said webs resulting from forces and moments on said model.

8. The balance according to claim 7 wherein four substantially evenly spaced slots and four support bars are provided.

9. The balance according to claim 7 wherein said core member is formed from a single piece of material that has been machined to the predetermined configuration.

10. The balance according to claim 7 wherein said sleeve is formed from a single piece of material that has been machined to the predetermined configuration.

11. The balance according to claim 7 further including an axial orifice for passage of wires from instrumentation to said model.

\* \* \* \* \*